Oct. 4, 1932. W. L. HART 1,881,052

AGITATED WEIGHING HOPPER

Filed April 6, 1929

Patented Oct. 4, 1932

1,881,052

UNITED STATES PATENT OFFICE

WALTER L. HART, OF MILWAUKEE, WISCONSIN

AGITATED WEIGHING HOPPER

Application filed April 6, 1929. Serial No. 353,180.

This invention relates to weighing hoppers of that class designed for weighing and discharging loose bulk material such as grain, ore, concrete aggregates, etc., so designed that complete discharge of the material shall be effected through agitation of the hopper at the time of discharge.

A further object of the invention is to provide means whereby the scale beams and parts shall be relieved of the weight of the hopper and contents at the time of agitation and discharge thereof, said mechanism being also effective to relieve said scales of the weight of the load while the hopper is being loaded.

A still further object of the invention is to produce a single means which shall simultaneously relieve the scale of the load, agitate the hopper and open the gate for the discharge of the contents.

With the general objects named in view, and others as will hereinafter appear, the invention consists in certain novel and useful features of construction and organization of parts as hereinafter described and claimed; and in order that it may be fully understood, reference is to be had to the accompanying drawing, in which:

Figure 1 is a front elevation of a hopper embodying the invention.

Figure 2 is a side view of the same.

Figure 3 is an enlarged section taken through a flexible clutch or connection forming a part of the gate operating mechanism.

In the said drawing, where like reference characters identify corresponding parts in all of the figures, 1 represents a base member for the support of a pair of uprights 2 which carry at their upper ends a relatively rectangular frame comprising two pairs of bars 3 and 4, respectively forming the ends and sides of a relatively rectangular frame. Some distance below the frame just described, a pair of angle irons 5 project forwardly from the corner posts 2, the extremities of said bars 5 being connected by a cross bar 6, thus forming a second rectangular frame, and said second frame is connected to the first or upper frame by front corner posts 7 and braced by inclined braces 8 extending to the base 1.

Received within the frames is a hopper 9, said hopper being provided with front and rear supporting brackets 10 and 11 respectively, and being provided on its external rear wall with suspension hooks 9a for supporting the hopper when it is being agitated or loaded as will hereinafter more particularly appear.

Extending longitudinally of the mechanism and journaled in the uprights 2 is a shaft 9b provided with a pair of projecting lugs 10a for engagement with the hooks 9a of the hopper, said shaft being provided at one of its ends with a downwardly extending operating lever 11a. The parts are so proportioned that upon movement of the lever arm 11a to the right as shown in Figure 2, the lugs 10a will engage the hooks 9a and will tip or elevate the hopper 9, but when said lever arm 11a is in the position shown by Figure 2, it will be noted that the lugs 10a are not engaged with the hooks 9a and that the hopper is free as far as said hooks are concerned. When the hopper is in the position shown in Figure 2, the front and rear supporting brackets 10 and 11 respectively rest on a supporting cradle comprising a pair of arms 12 pivotally suspended from ears 13 on scale arms 14 pivotally suspended by means of rods 15 from the upper rectangular frame as illustrated, the front ends of the scale arms 14 being provided with scale levers 16 extending from opposite ends of the mechanism to the center where they are connected by means of a rod 17 to a scale beam 18 pivotally suspended at 19 from the front part of the upper rectangular frame, the free end of said beam 18 projecting beyond the mechanism and being pivotally connected by rod 20 to one end of a second scale beam 21 which is pivotally secured at an intermediate point to a fixed angle iron 22 secured to the supporting frame, the opposite end of second scale beam 21 being connected by a rod 23 to one end of a weighing scale beam 24 mounted in any suitable manner at a convenient point for manipulation by an attendant. Adjacent the scale beam 24 is an operating wheel 25 for manual operation, said wheel applying power to a sprocket chain 26 extending downwardly and forwardly and encircling a sprocket gear on a shaft 27 equipped with a suitable bevel gear 28 and a second gear 29 for driving connections with other gears hereinafter identified.

When the hopper 9 is resting on the scale as above described, as it slopes downwardly and rearwardly, there is a tendency for it to swing inwardly on the scale, and in order to overcome this tendency the lower part of the hopper is equipped with an abutment bracket 30 for engagement with a roller 31 pivoted on a bracket 32 carried by a cross frame 33 connecting the corner uprights 2. The hopper and scale thus move vertically when in operation.

The bottom rear face of the hopper is provided with a discharge gate or door 34 pivoted at its upper end between ears 35 formed integrally with the hopper, said gate being provided with a lug 36 to which a gate operating rod 37 is connected. The rod 37 extends upwardly and is pivoted to a lever arm 38 on a shaft 39 journaled in bearings 40 carried by a flange 41 extending from the hopper as illustrated. The end of the shaft 39 is equipped with a bevel gear 42 which enmeshes with a second bevel gear 43 mounted on a stub shaft 44 journaled in bearings 45 carried by a vertical extension 45ª of hopper flange 41. The lower end of said shaft carries a slotted member 46 forming a flexible clutch for engagement with a cross pin 47 at the upper reduced end of a shaft 48 journaled in bearings 49 carried by brackets 50 mounted on the corner post of the structure and having at its lower end a bevel gear 51 enmeshed with the bevel gear 28 of shaft 27. Upon operation of the spocket chain in the proper direction it will be evident that the gate 34 will be opened and that the flexible joint or clutch 46–47 permits the hopper to swing unimpeded on the scale beams when the hopper is being weighted.

Extending longitudinally of the frame is a shaft 52 journaled in bearings 53 and having a gear wheel 54 enmeshed with the gear 29. The opposite end of the shaft 52 carries a lever 55 engaged in a slot 56 in the end of lever arm 57 pivoted at its upper end to a flange 58 secured to the adjacent corner upright 2 of the supporting frame.

Extending transversely of the machine is a constantly driven shaft 59 having its extremity in substantial alinement with the corner upright 2 of the supporting frame and carrying a clutch member 60. Freely journaled on said shaft is a second clutch and agitating member 61, which is formed with a circumferential groove in which a band member 61a is loosely fitted, said last named member being equipped with a cross pin 62 for engagement in a slot 63 in the lever arm 57. Upon rotation of the shaft 52 and consequent operation of the lever arm 57, it will be apparent that the freely rotating member 61 will be moved to the right as shown in Figure 2, said member being formed with an undulatory operating face 64 for engagement with a pair of rollers 65 journaled in the opposite ends of a fork 66 carried by the lower end of the lever arm 11a. It will be evident that upon movement of the lever arm 11a as described that the lugs 10a will engage the hooks 9a and will commence the elevation or tipping of the hopper to the dotted line position shown in Figure 2, since the hooks 10a have a circular path and tend to simultaneously elevate and laterally move the top of the hopper, while the lower end thereof maintains contact with the roller 31. The intial movement of the lever arm 11 will elevate the hopper as described and continued movement thereof will enmesh the clutch member 60 with a cooperating clutch member 67 formed in the face of the operating member 61 within the undulatory portion 64 thereof. Upon enmeshment of the clutch members as described, it will be apparent that the hopper will be shaken or agitated through the rolling of the wheels 65 over the undulatory surface 64 of the member 61 and that it will be eventually cleaned should there be any tendency of the material to stick or adhere to the interior of the hopper, it being evident that the mechanism is peculiarly adapted for the weighing of concrete aggregates which are always more or less damp or wet and therefore tend to adhere in the aggregate hopper.

In the foregoing specification I have set forth in considerable detail an apparatus and mode of operation which I have found suitable for carrying out the prime object of the invention, namely, an apparatus which will effectually clean the hopper and protect the scale mechanism. It is to be understood, however, that the details are illustrative only and for the purpose of making the invention clear, and that I do not regard my invention as limited in any sense to the details illustrated, except in so far as such limitations are included within the terms of the appended claims in which it is my intention to claim all novelty inherent in my invention as broadly as is possible in view of the prior art.

I claim:

1. The combination with a supporting frame, of a weighing cradle carried by said frame, a hopper adapted to be supported by said cradle, and means carried by said frame for raising the hopper from the cradle and effecting the agitation thereof.

2. The combination with a supporting frame, of a weighing cradle carried by said frame, a hopper adapted to be supported by said cradle, elevating means carried by the frame for raising the hopper from the cradle, and means coöperating with the elevating means to effect agitation of said hopper.

3. The combination with a supporting frame, of a weighing cradle carried by said frame, a hopper adapted to be supported by said cradle, a discharge gate for said hopper, and gate operating mechanism supported in part by said frame and including a longitudinally extensible connection whereby the hopper may be freely supported by said cradle.

4. The combination with a supporting frame, of a weighing cradle carried by said frame, a hopper adapted to be supported by said cradle, a discharge gate for said hopper, means for inclining the hopper, and gate operating mechanism supported in part by said frame and including a flexible connection whereby the hopper may be freely supported by said cradle or inclined by said inclining means.

5. The combination with a supporting frame, of a weighing cradle carried by said frame, a hopper adapted to be supported by said cradle, a support for said hopper, and means for selectively transferring the hopper between the support and cradle and for effecting agitation of the hopper when carried by the support.

6. The combination with a supporting frame, of a weighing cradle carried by said frame, a hopper adapted to be supported by said cradle, a support for said hopper, a discharge gate for said hopper, and means for selectively transferring the hopper between the support and the cradle, said means being also operable to open the gate when the hopper is carried by the support.

7. The combination with a supporting frame, of a weighing cradle carried by said frame, a hopper adapted to be supported by said cradle, a support for said hopper, a discharge gate for said hopper, and means for selectively transferring the hopper between the support and the cradle, said means being also operable to agitate the hopper and open the gate when said hopper is carried by the support.

8. The combination with a supporting frame, of a weighing cradle carried by said frame, a hopper adapted to be supported by said cradle, an elevating support for said hopper, a constantly driven shaft, a clutch element fixed to the shaft, and a second clutch element loosely journaled on said shaft and adapted for interlocking engagement with said first-named clutch element and to operate said hopper elevating support.

9. The combination with a supporting frame, of a weighing cradle carried by said frame, a hopper adapted to be supported by said cradle, an elevating support for said hopper, a constantly driven shaft, a clutch element fixed to the shaft, and a second clutch element loosely journaled on said shaft and adapted for interlocking engagement with said first-named clutch element, said movable clutch element having a cam face in contact with the hopper elevating support and being slidable longitudinally of the shaft, and means to slide said movable clutch element to effect operation of the hopper elevating means, continued movement thereof interclutching the clutch elements and causing said cam face to effect agitation of the hopper.

10. In concrete aggregate handling apparatus, the combination of a supporting frame, a hopper thereon, weighing scales for the hopper and its contents, and controllable means to relieve the weighing means of the weight of the hopper and its contents by changing the angle of the hopper with respect to the horizontal.

11. In concrete aggregate handling apparatus, the combination of a supporting frame, a hopper thereon, weighing scales for the hopper and its contents, controllable means to relieve the weighing means of the weight of the hopper and its contents, and to vibrate the hopper when not supported by the weighing means.

12. In concrete aggregate handling apparatus, the combination of a supporting frame, a hopper thereon, weighing scales for the hopper and its contents, controllable means to relieve the weighing means of the weight of the hopper and its contents, and to vibrate the hopper when not supported by the weighing means, the controllable means being connected to operate both said relieving and vibrating instrumentalities.

13. In concrete aggregate handling apparatus, the combination of a supporting frame, a hopper thereon, weighing scales for the hopper and its contents, controllable means to relieve the weighing means of the weight of the hopper and its contents, and mechanism to cause discharge of the hopper operable with the last-named means.

14. In concrete aggregate handling apparatus, the combination of a supporting frame, a hopper thereon, weighing scales for the hopper and its contents, controllable means to relieve the weighing means of the weight of the hopper and its contents, and to vibrate the hopper when not supported by the weighing means, the controllable means being connected to operate both said relieving and vibrating instrumentalities, discharge means for the hopper, and an operating instrumentality for the discharge means coacting with said controllable means.

15. In concrete aggreate handling apparatus, the combination of a supporting frame, a hopper thereon, weighing scales for the hopper and its contents, controllable means to relieve the weighing means of the weight of the hopper and its contents, and mechanism to vibrate the hopper and cause discharge of its contents in timed relation to the operation of said controllable means.

16. In combination, a supporting frame, a hopper thereon, weighing scales for the hopper and its contents, controllable means to relieve the weighing means of the weight of the hopper and its contents, and means common to said controllable means to cause vibration of the hopper when the controllable means is actuated.

17. In combination, a supporting frame, a hopper thereon, weighing scales for the hopper and its contents, controllable means to relieve the weighing means of the weight of the hopper and its contents, means common to said controllable means to cause vibration of the hopper when the controllable means is actuated, and discharge means for the hopper operable by the controllable means.

18. In combination, a supporting frame, a hopper thereon, weighing scales for the hopper and its contents, means to shift the weight of the hopper and its contents on and off the weighing scales by changing the angle of the hopper with respect to the horizontal, and mechanism to vibrate the hopper when off the scale.

19. In combination, a supporting frame, a hopper thereon, weighing scales for the hopper and its contents, means to shift the weight of the hopper and its contents on and off the weighing scales, mechanism to vibrate the hopper when off the scales, and mechanism to cause discharge of the hopper as it is vibrated.

In testimony whereof I affix my signature.

WALTER L. HART.